US010735199B2

United States Patent
Sanghvi

(10) Patent No.: US 10,735,199 B2
(45) Date of Patent: Aug. 4, 2020

(54) FILE BASED TRANSMISSION VALIDATION AND FAILURE LOCATION IDENTIFICATION SYSTEM

(71) Applicant: BANK OF AMERICA CORPORATION, Charlotte, NC (US)

(72) Inventor: Siten Sanghvi, Jersey City, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 198 days.

(21) Appl. No.: 15/860,319

(22) Filed: Jan. 2, 2018

(65) Prior Publication Data
US 2019/0207766 A1 Jul. 4, 2019

(51) Int. Cl.
*H04L 29/06* (2006.01)
*H04L 9/32* (2006.01)
*H04L 9/06* (2006.01)

(52) U.S. Cl.
CPC .......... *H04L 9/3236* (2013.01); *H04L 9/0643* (2013.01); *H04L 9/3239* (2013.01); *H04L 63/123* (2013.01); *H04L 9/3247* (2013.01); *H04L 2209/38* (2013.01)

(58) Field of Classification Search
CPC ... H04L 9/0643; H04L 9/3236; H04L 9/3239; H04L 63/123
See application file for complete search history.

(56) References Cited

U.S. PATENT DOCUMENTS

| 3,568,153 | A |   | 3/1971 | Kurtz et al. |
| 3,648,239 | A |   | 3/1972 | Carter et al. |
| 3,657,699 | A |   | 4/1972 | Rocher et al. |
| 3,668,631 | A |   | 6/1972 | Griffith et al. |
| 3,725,579 | A |   | 4/1973 | Sturzinger |
| 3,796,830 | A |   | 3/1974 | Smith |
| 3,949,208 | A |   | 4/1976 | Carter |
| 3,958,081 | A |   | 5/1976 | Ehrsam et al. |
| 4,074,066 | A |   | 2/1978 | Ehrsam et al. |
| 2003/0084298 | A1 | * | 5/2003 | Messerges ............ H04L 9/3236 713/176 |
| 2005/0177603 | A1 | * | 8/2005 | Shavit .................. G06F 11/2074 |
| 2015/0288512 | A1 | * | 10/2015 | McGregor ............ H04L 9/0836 713/193 |
| 2018/0373776 | A1 | * | 12/2018 | Madisetti .............. H04L 9/3234 |

FOREIGN PATENT DOCUMENTS

EP 1193904 A2 4/2002

* cited by examiner

*Primary Examiner* — Dao Q Ho
(74) *Attorney, Agent, or Firm* — Michael A. Springs; Moore & Van Allen PLLC; Nicholas C. Russell

(57) ABSTRACT

Embodiments of the invention are directed to a system, method, or computer program product for file transmission validation and failure location identification. The invention provides a cryptographic hashing function to generate a unique hash for each block in a file being transmitted. The hash from the previous block is included along with the contents of the next block to create the hash for the next block. Similarly the hash from the previous blocks is used with the data of that block to generate the hash forming onto a block chain. The files can only be transmitted to a select group of servers forming a private block chain network within the entity server systems after the files are transmitted to the target location. As such, the system can recalculate the hashes and match hash blocks to identify an exact file location of a transmission failure.

17 Claims, 8 Drawing Sheets

FILE BASED TRANSMISSION VALIDATION AND FAILURE LOCATION IDENTIFICATION SYSTEM

BACKGROUND

In current file transfers between servers, a row count or checksum at the trailer of the file provides an indication of blocks within the file. However, in the case of a transmission issue the trailer validation would fail since the end of the count would not be reached. However, there would be no indication as to which block had an issue. In this way, the entire file or batch transfer must be restarted and transmitted.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for file based transmission validation and failure location identification system.

Currently when files are transferred between servers systems use rudimentary row counts, checksum or the like at the trailer or end of the file that indicates how many blocks are within the file and the control total of the file. In the case of a transmission issue, the trailer validation is not ideal. This is because the trailer validation would fail but it would not tell the user which block had an issue. As such, the whole file would need to be re-transmitted. If there are a series of large files that contain even a single block error, the entire batch would need to be re-transmitted instead of just the failed block.

However, in the case of a transmission issue the trailer validation would fail since the end of the count would not be reached. However, there would be no indication as to which block had an issue. In this way, the entire file or batch transfer must be restarted and transmitted.

The system provides a cryptographic hashing function, such as but not limited to SHA256 that can be used to generate a unique hash for each block of the files and it can be added to the end of each block. The hash from the previous block is included along with the contents of the next block to create the hash for the next block. Similarly the hash from the previous blocks is used with the data of that block to generate the hash forming onto a block chain.

The blocks within each file can only be transmitted to a select group of servers forming a private block chain network within the entity server systems after the files are transmitted to the target location. As such, the system can recalculate the hashes and match the final hash. If it matches the content of the file, the file is considered validated. In the case of a mismatch, the hash for each block can be comparted to identify the block that had an issue. In case where multiple files with multiple blocks within the file are transmitted, a merkle tree can be created with the last hash of all the files and the single hash from the merkle tree can be used to validate the content of multiple files at one time.

Embodiments of the invention relate to systems, methods, and computer program products for file based transmission validation and failure location identification, the invention comprising: receiving a file comprising one or more blocks for private transmission to a receiving server; generating a cryptographic hash for each of the one or more blocks; tagging the cryptographic hash onto each of the one or more blocks, wherein the tagged cryptographic hash includes a hash value, a hash from a previous block, and data about the one or more blocks the hash is tagged to; generating a complete file cryptographic hash, wherein the complete file cryptographic hash is a single unique hash for the file comprising the one or more blocks; transmitting the file to the receiving server upon tagging of each of the one or more blocks with the cryptographic hashes; and comparing the complete file cryptographic hash of the transmitted file with a regenerated cryptographic hash of the file received at the receiving server.

In some embodiments, the invention further comprises identifying a mismatch between the complete file cryptographic hash of the transmitted file with the regenerated cryptographic hash of the file received at the receiving server, wherein identifying the mismatch further comprises; comparing each cryptographic hash on each of the one or more blocks of the file to identify an exact data point of mismatch; and re-transmitting the block associated with the exact data point of the mismatch.

In some embodiments, the invention further comprises identifying an exact match between the complete file cryptographic hash of the transmitted file with the regenerated cryptographic hash of the file received at the receiving server and validating the transmission.

In some embodiments, receiving the file comprising one or more blocks for private transmission to a receiving server further comprises receiving legacy files with a header, data, and trailer for conversion and/or receiving new files with a digitally signed block chain file.

In some embodiments, the invention further comprises tagging a first cryptographic hash onto a first block of the one or more blocks containing a hash and data about the first block and tagging a second cryptographic hash onto a second block of the one or more blocks containing the first cryptographic hash and data about the second block.

In some embodiments, each cryptographic hash generated for each of the one or more blocks contains a unique hash value, data about the block associated with the hash, and a copy of a previous block cryptographic hash. In some embodiments, the complete file cryptographic hash is a SHA256 hash.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
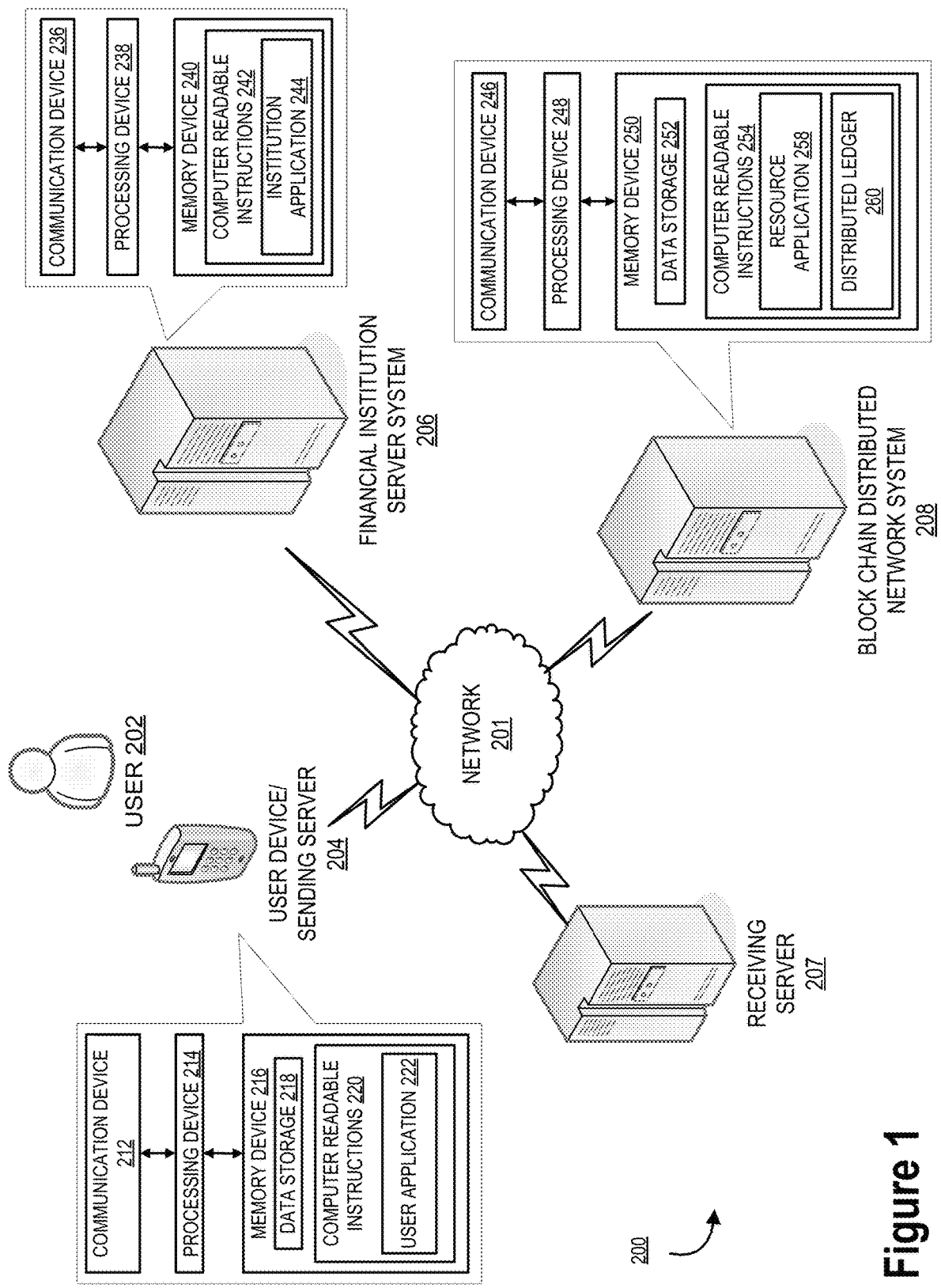
Figure 2A:
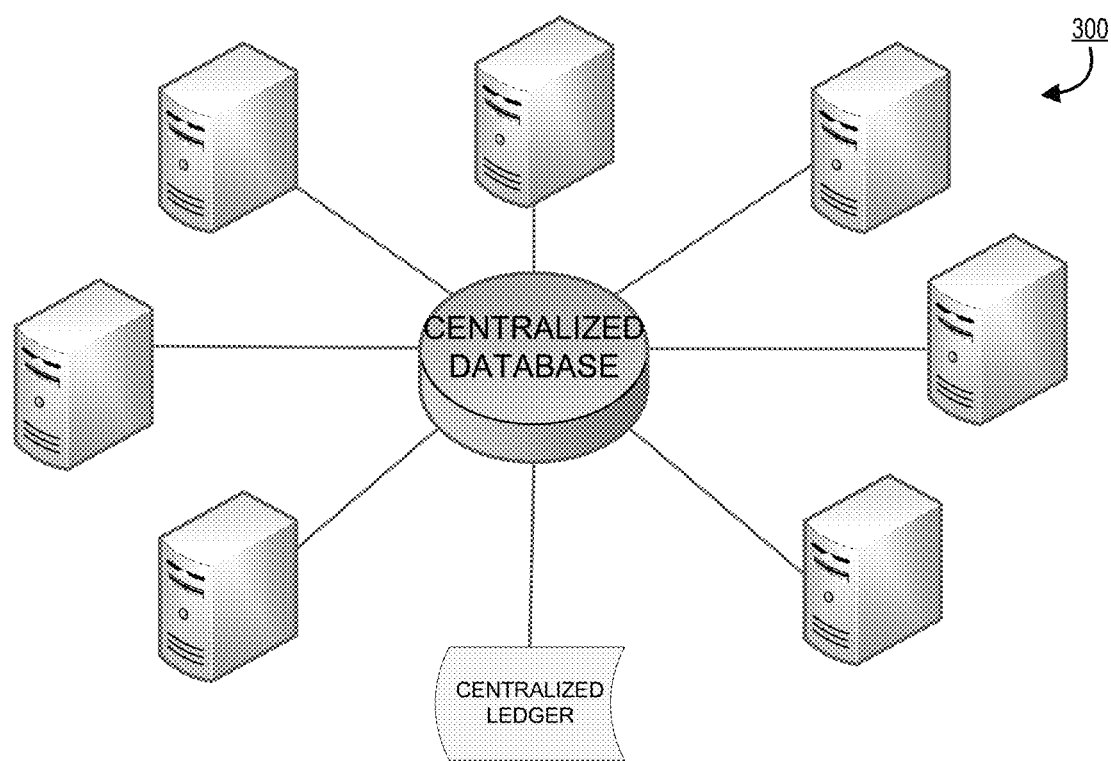
Figure 2B:
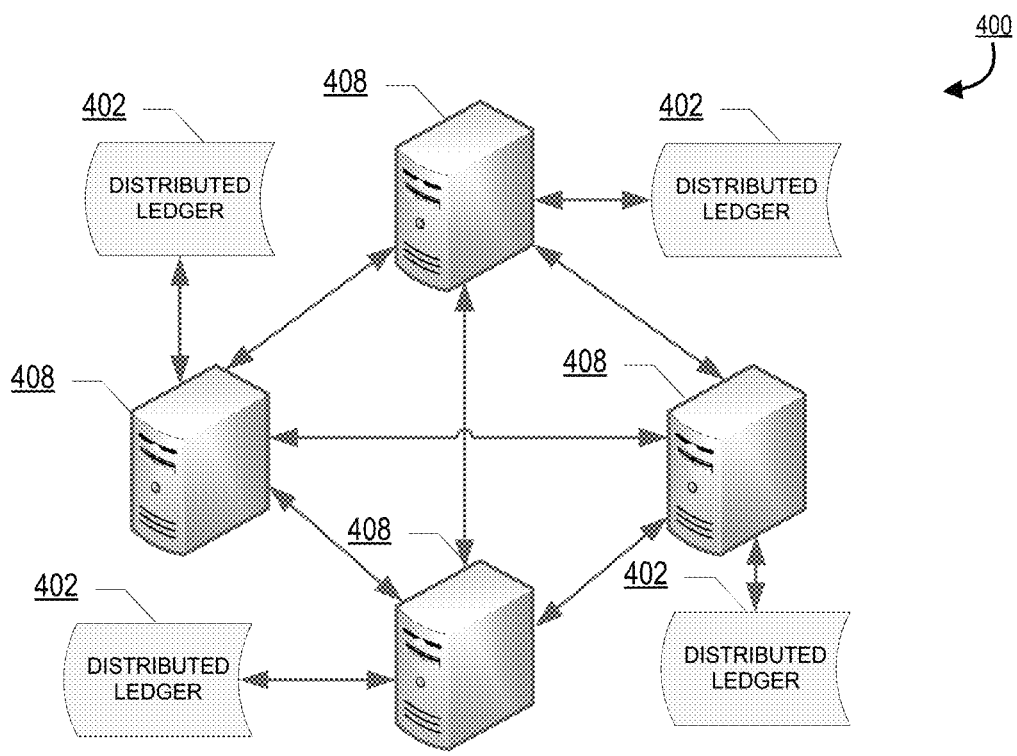
Figure 3:
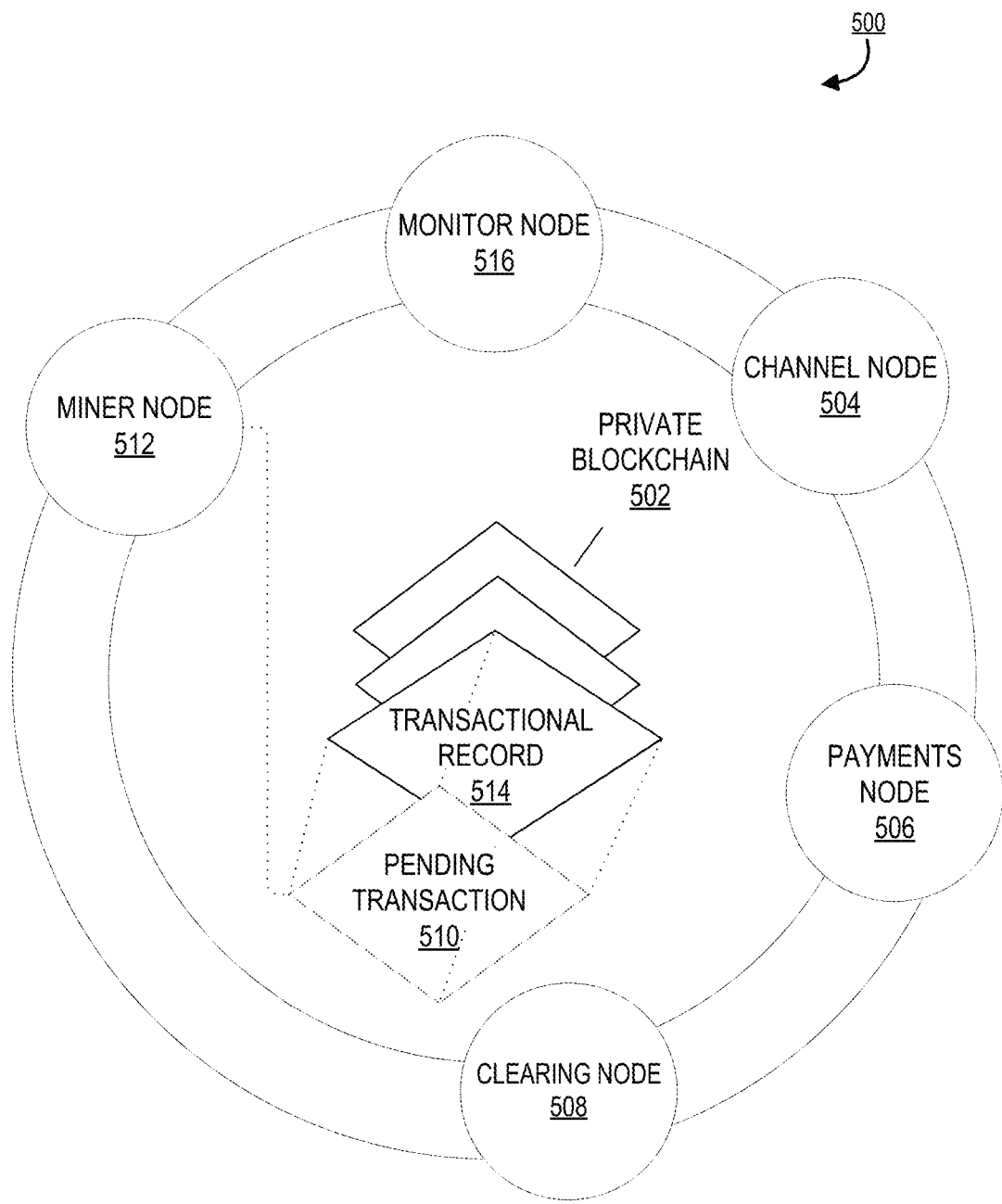
Figure 4:
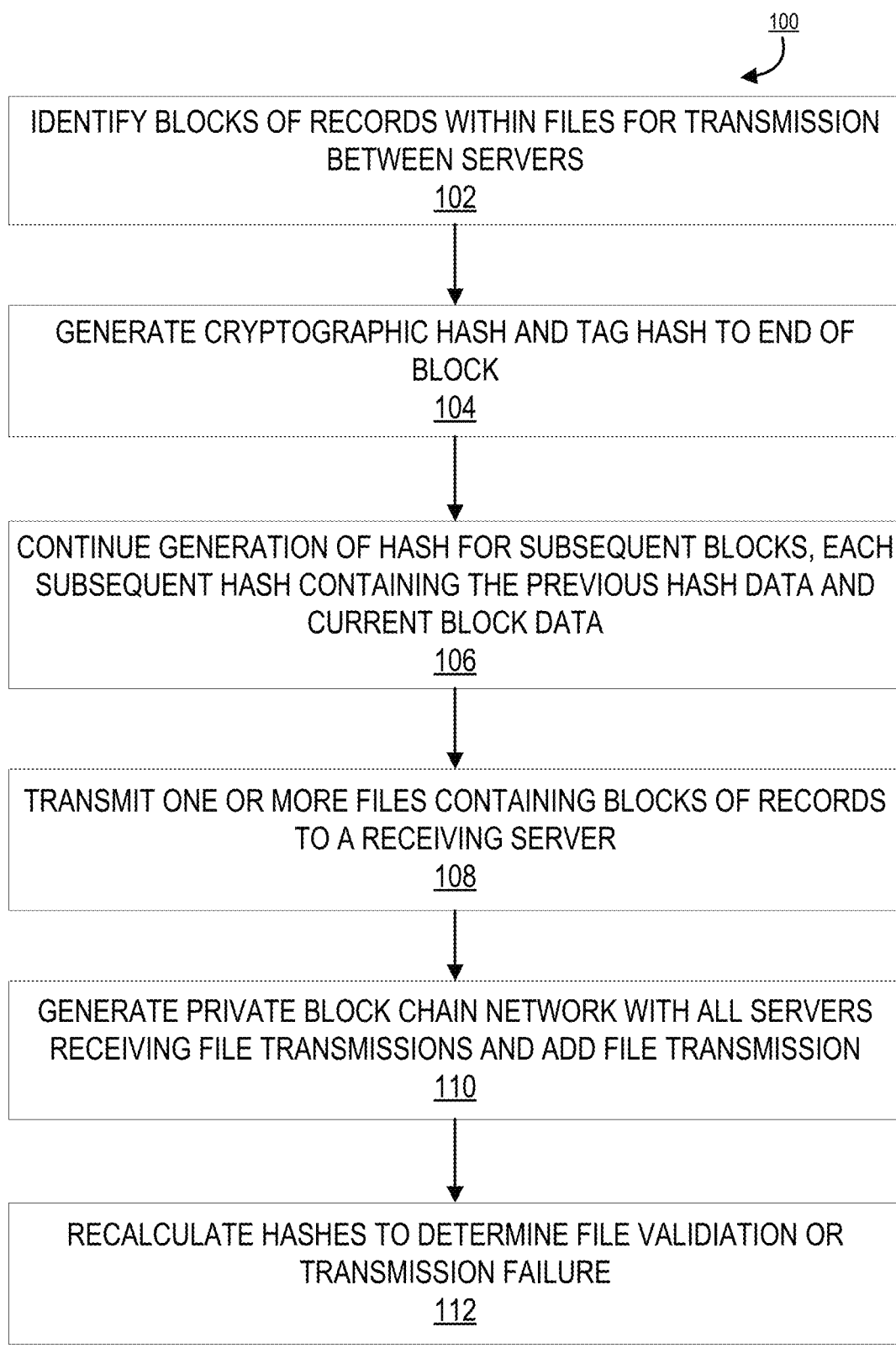
Figure 5:
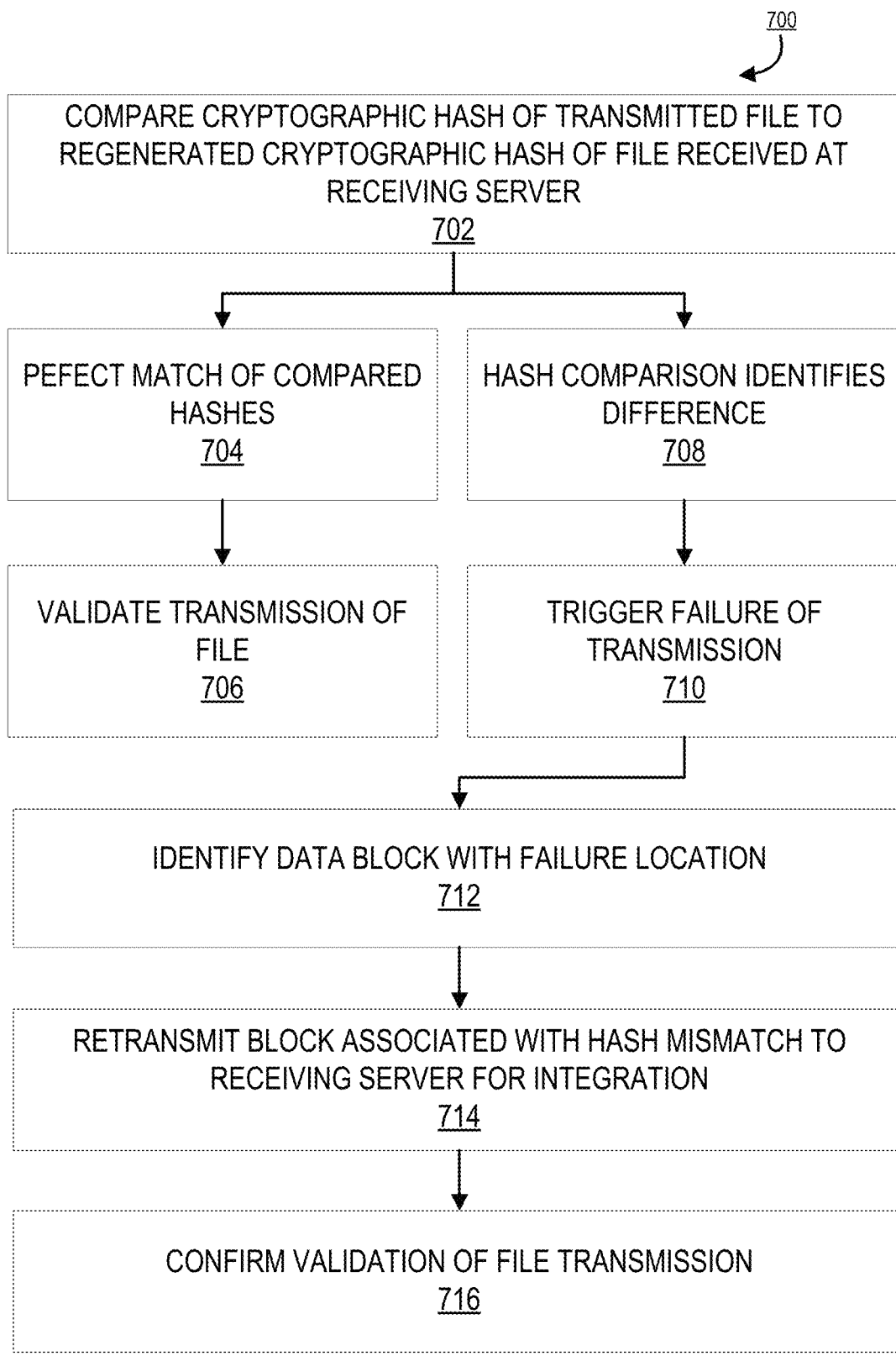
Figure 6:
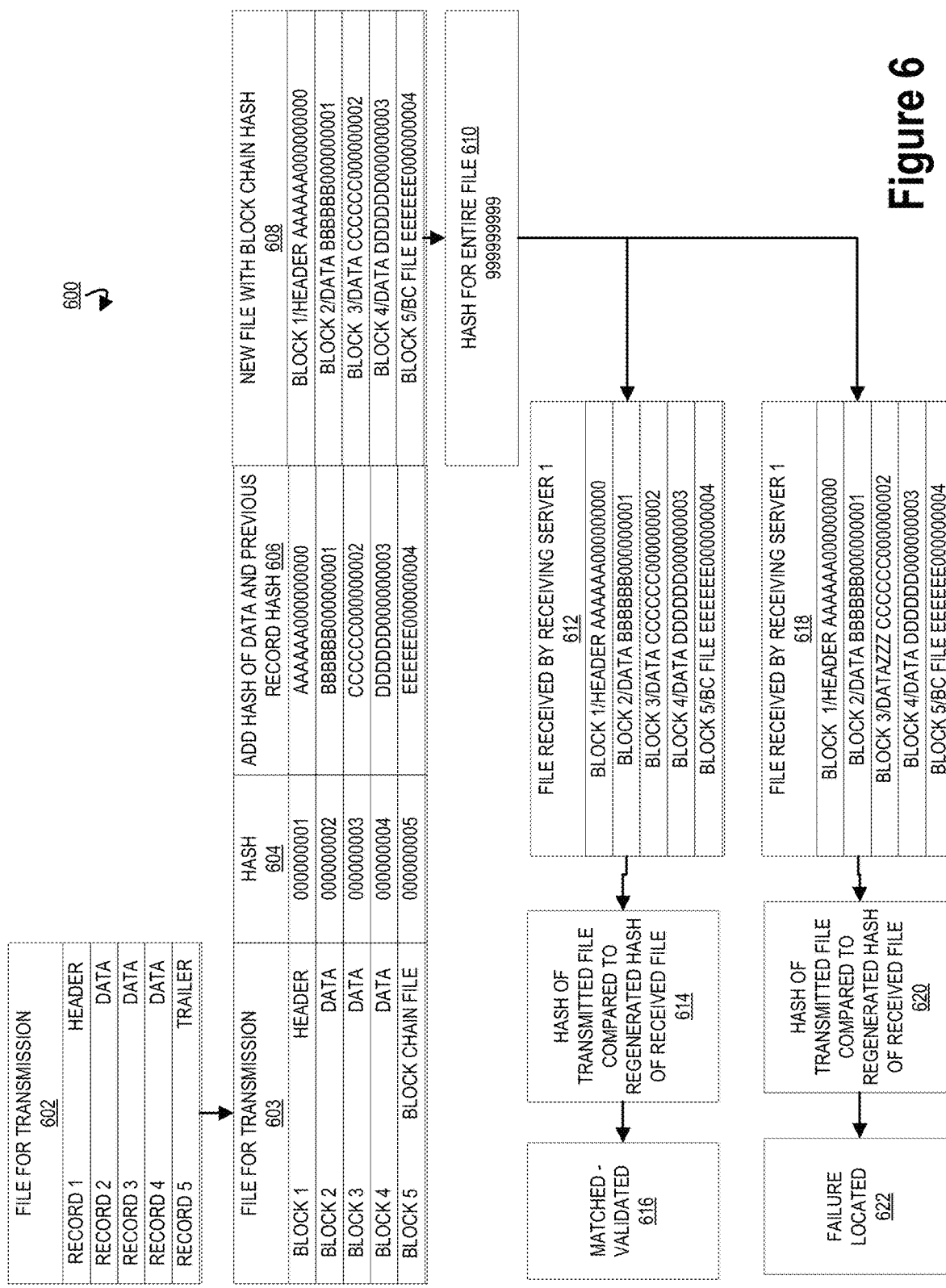
Figure 7:
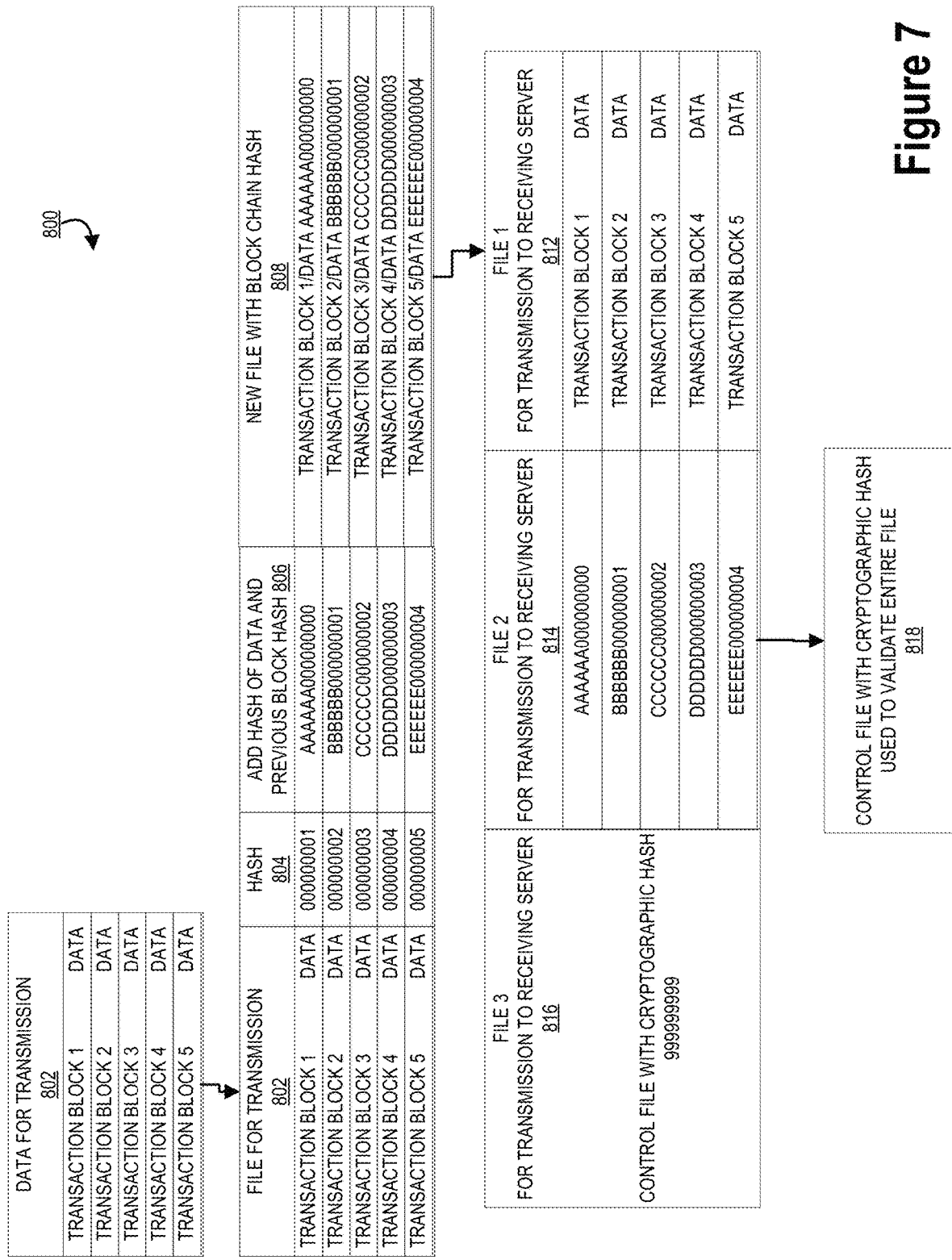
Figure 8:
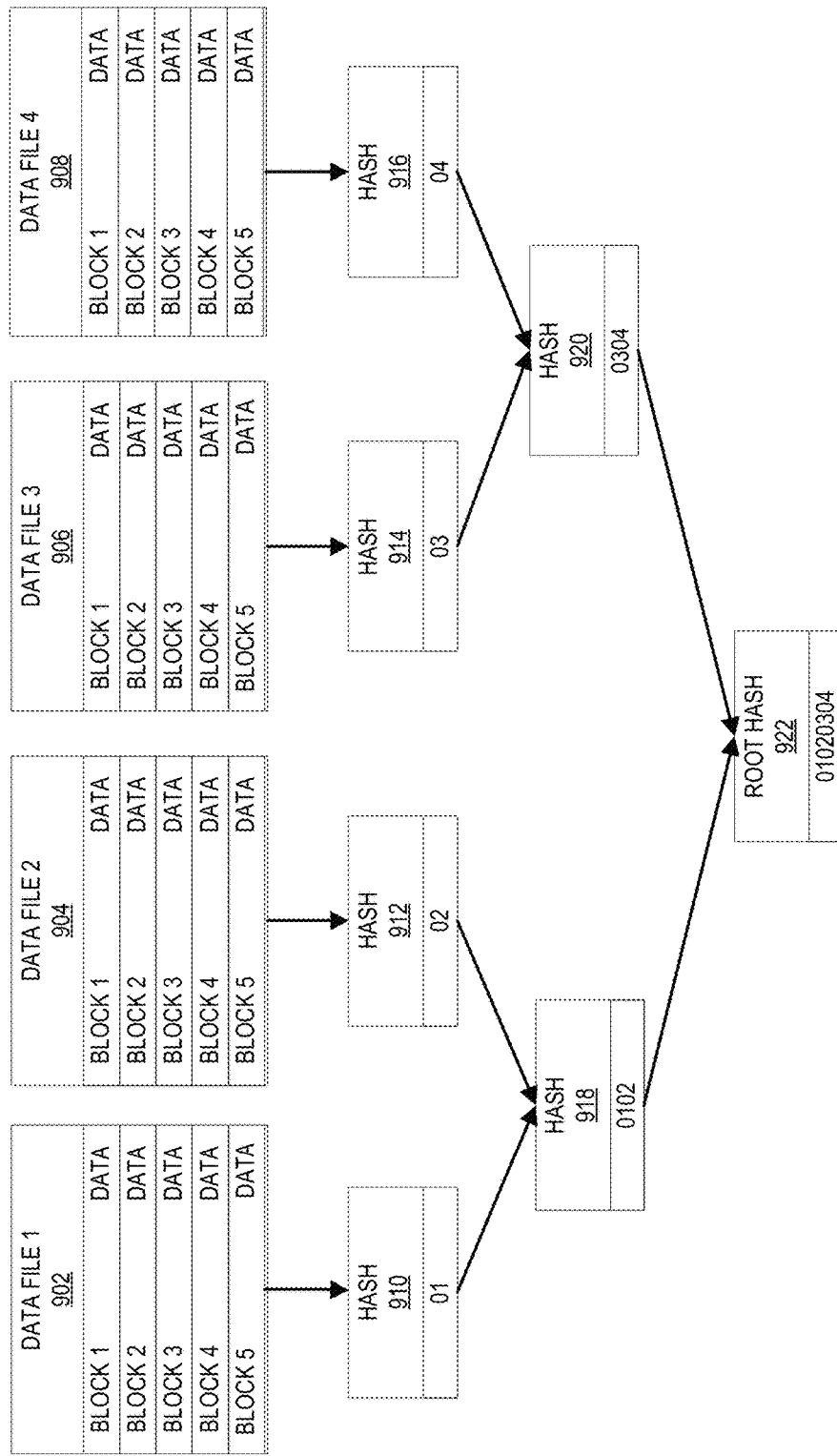

Having thus described embodiments of the invention in general terms, reference will now be made to the accompanying drawings, wherein:

FIG. 1 provides a file transmission validation and failure location identification system environment, in accordance with one embodiment of the present invention;

FIG. 2A provides centralized database architecture environment, in accordance with one embodiment of the present invention;

FIG. 2B provides a high level block chain system environment architecture, in accordance with one embodiment of the present invention;

FIG. 3 provides a high level process flow illustrating node interaction within a block chain system environment architecture, in accordance with one embodiment of the present invention;

FIG. 4 provides a high level process map illustrating hash tagging of blocks for file transmission, in accordance with one embodiment of the present invention;

FIG. 5 provides a process map illustrating validation and failure location processing, in accordance with one embodiment of the present invention;

FIG. 6 provides a detailed process map illustrating hash generation and file transmission for validation or failure location identification, in accordance with one embodiment of the present invention;

FIG. 7 provides a detailed process map illustrating hash generation and file transmission for validation or failure location identification, in accordance with one embodiment of the present invention; and FIG. 8 provides a detailed process map illustrating using a merkle tree for hash generation and file transmission for validation or failure location identification, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, as used herein the term "user device" or "mobile device" may refer to mobile phones, personal computing devices, tablet computers, wearable devices, and/or any portable electronic device capable of receiving and/or storing data therein.

A "user" may be a financial institution employee or associate (e.g., an underwriter, a project manager, an IT specialist, a manager, an administrator, an internal operations analyst, bank teller or the like) capable of operating the system described herein. For purposes of this invention, the term "user" and "user" may be used interchangeably.

"Block chain" as used herein refers to a decentralized electronic ledger of data records which are authenticated by a federated consensus protocol. Multiple computer systems within the block chain, referred to herein as "nodes" or "compute nodes," each comprise a copy of the entire ledger of records. Nodes may write a data "block" to the block chain, the block comprising data regarding a transaction. In some embodiments, only miner nodes may write transactions to the block chain. In other embodiments, all nodes have the ability to write to the block chain. In some embodiments, the block may further comprise a time stamp and a pointer to the previous block in the chain. In some embodiments, the block may further comprise metadata indicating the node that was the originator of the transaction. In this way, the entire record of transactions is not dependent on a single database which may serve as a single point of failure; the block chain will persist so long as the nodes on the block chain persist. A "private block chain" is a block chain in which only authorized nodes may access the block chain. In some embodiments, nodes must be authorized to write to the block chain. In some embodiments, nodes must also be authorized to read from the block chain. Once a transactional record is written to the block chain, it will be considered pending and awaiting authentication by the miner nodes in the block chain.

"Miner node" as used herein refers to a networked computer system that authenticates and verifies the integrity of pending transactions on the block chain. The miner node ensures that the sum of the outputs of the transaction within the block matches the sum of the inputs. In some embodiments, a pending transaction may require validation by a threshold number of miner nodes. Once the threshold number of miners has validated the transaction, the block becomes an authenticated part of the block chain. By using this method of validating transactions via a federated consensus mechanism, duplicate or erroneous transactions are prevented from becoming part of the accepted block chain.

A "block" as used herein may refer to one or more records of a file with each record comprising data for transmission to a server. In some embodiments, the term record may be used interchangeably with the term block to refer to one or more transactions or data within a file being transmitted.

Embodiments of the invention provide a virtual private ledger system maintained between an upstream entity and a downstream entity. In some embodiments, the downstream entity may be a financial institution. Embodiments use a private ledger to write transaction records to the private block chain, where the transaction records written to the block chain represent the transactional data within the private ledger. The downstream entity accesses the block chain and executes a number of processes based only on the authenticated blocks within the block chain, thereby eliminating the need for the downstream application to continuously seek confirmations from the downstream application. This increases the efficiency of the system while simultaneously increasing security and decreasing data error rates.

Embodiments of the invention also provide a system for distributing transaction workflow in a private block chain. In some embodiments, each of the nodes on the private block chain are responsible for performing one or more functions to process the transaction. In particular, each node monitors the block chain for blocks that are relevant to it while ignoring the blocks that are not relevant. Upon discovering a relevant block, the node performs its designated functions to process the transaction, i.e. the blocks within the block chain trigger the nodes to perform their functions. Once a block has been authenticated, a node may rely on the data record stored therein without utilizing a complex reconciliation system to confirm the data's integrity. By using the block chain to control the workflow of the transaction, the system may avoid data errors resulting from failure in communications amongst nodes and prevents the need for computing resource-intensive data reconciliation processes.

Embodiments of the invention also provide a system for authorizing block chain transactions by distributed ledger keys. In such an embodiment, each block comprises a transaction record and an authorization key, indicating the originating node (the sender) of the transaction. The nodes within the private block chain comprise a "white list," comprising a list of authorized senders of the transaction. In this way, a receiving node will only process a transaction in the block chain if the sender is one of the authorized senders on the white list; otherwise, the node rejects the transaction, thereby increasing the security of transactions within the system. In some embodiments, the node may write a rejection block to the block chain.

In current file transfers between servers, a row count or checksum at the trailer of the file provides an indication of records within the file. However, in the case of a transmission issue the trailer validation would fail since the end of the count would not be reached. However, there would be no indication as to which record had an issue. In this way, the entire file or batch transfer must be restarted and transmitted.

The system provides a cryptographic hashing function, such as but not limited to SHA256 that can be used to generate a unique hash for each block of the files and it can be added to the end of each block. The hash from the previous block is included along with the contents of the next block to create the hash for the next block. Similarly the hash from the previous blocks is used with the data of that block to generate the hash forming onto a block chain.

The records within the block can only be transmitted to a select group of servers forming a private block chain network within the entity server systems after the files are transmitted to the target location. As such, the system can recalculate the hashes and match the final hash. If it matches the content of the file, the file is considered validated. In the case of a mismatch, the hash for each block can be comparted to identify the block that had an issue. In case where multiple files are transmitted, a merkle tree can be created with the last hash of all the files and the single hash from the merkle tree can be used to validate the content of multiple files at one time.

FIG. 1 provides a unique system that includes specialized servers and system communicably linked across a distributive network of nodes required to perform the functions of file transmission validation or failure location identification.

FIG. 1 provides a file transmission validation and failure location identification system environment 200, in accordance with one embodiment of the present invention. As illustrated in FIG. 1, the block chain distributed network system 208 is operatively coupled, via a network 201 to the user system/sending server 204, receiving server 207, and to the financial institution server system 206. In this way, the block chain distributed network system 208 can send information to and receive information from the user device/sending server 204, receiving server 207, and the financial institution server system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual or system that desires to transmit one or more files across the network 201 to a receiving server 207. In other embodiments, a user 202 is an entity providing a file or file batch to the system for transmission across to a receiving server 207. In other embodiments a user 202 is an associate of the entity and is transmitting files from one server to another. In some embodiments, the user 202 has a user device, such as a mobile phone, tablet, or the like that may interact with and control the distribution of files from the sending server to the receiving server 207. FIG. 1 also illustrates a user system/sending server 204. The user device/sending server 204 may be, for example, a server or the like in connection with a user device, such as a desktop computer, laptop, tablet, cellular telephone, or the like. The user device/sending server 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the financial institution server system 206, the receiving server 207, and the block chain distributed network system 208. As such, the communication device 212 generally comprises a modem, server, or other device for communicating with other devices on the network 201.

The user device/sending server 204 comprises computer-readable instructions 220 and data storage 218 stored in the memory device 216, which in one embodiment includes the computer-readable instructions 220 of a user application 222. In some embodiments, the user application 222 allows a user 202 to transmit files from one server to another and to track the transmission validation or identify the failure location of the transmission.

The receiving server 207 comprises the same or similar features as the user device/sending server 204 and is the server receiving the files being transmitted. Including comprising computer-readable instructions and data storage stored in the memory device, which in one embodiment includes the computer-readable instructions for one or more applications. In some embodiments, the one or more applications allow for receiving of files or blocks from one or more servers.

As further illustrated in FIG. 1, the block chain distributed network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the financial institution server system 206 and the user system/sending server 204. As such, the communication device 246 generally comprises a modem, server, or other device for communicating with other devices on the network 201.

As further illustrated in FIG. 1, the block chain distributed network system 208 comprises computer-readable instructions 254 stored in the memory device 250, which in one embodiment includes the computer-readable instructions 254 of a resource application 258. In some embodiments, the memory device 250 includes data storage 252 for storing data related to the system environment, but not limited to data created and/or used by the resource application 258.

Embodiments of the block chain distributed network system 208 may include multiple systems, servers, computers or the like maintained by one or many entities. FIG. 1 merely illustrates one of those systems that, typically, interacts with many other similar systems to form the block chain. The block chain distributed network system 208 will be outlined below in more detail with respect to FIGS. 2-3. In some embodiments, the financial institution server system 206 may be part of the block chain. Similarly, in some embodiments, the block chain distributed network system 208 is part of the financial institution server system 206. In other embodiments, the financial institution server system 206 is distinct from the block chain distributed network system 208.

In one embodiment of the block chain distributed network system 208 the memory device 250 stores, but is not limited to, a resource application 258 and a distributed ledger 260. In some embodiments, the distributed ledger 260 stores data including, but not limited to, the block chains for block identification of failure locations within a file transfer block. In one embodiment of the invention, both the resource application 258 and the distributed ledger 260 may associate with applications having computer-executable program code that instructs the processing device 248 to operate the network communication device 246 to perform certain communication functions involving described herein. In one embodiment, the computer-executable program code of an application associated with the distributed ledger 260 and resource application 258 may also instruct the processing device 248 to perform certain logic, data processing, and data storing functions of the application.

The processing device 248 is configured to use the communication device 246 to gather data, such as data corresponding to transactions, blocks or other updates to the distributed ledger 260 from various data sources such as other block chain network system. The processing device 248 stores the data that it receives in its copy of the distributed ledger 260 stored in the memory device 250.

As illustrated in FIG. 1, the financial institution server system 206 is connected to the block chain distributed network system 208 and is associated with a financial institution network. In this way, while only one financial institution server system 206 is illustrated in FIG. 1, it is understood that multiple network systems may make up the system environment 200. The financial institution server system 206 generally comprises a communication device 236, a processing device 238, and a memory device 240. The financial institution server system 206 comprises computer-readable instructions 242 stored in the memory device 240, which in one embodiment includes the computer-readable instructions 242 of an institution application 244. The financial institution server system 206 may communicate with the block chain distributed network system 208. While the block chain distributed network system 208 may communicate with the financial institution server system 206 via a secure connection generated for secure encrypted communications between the two systems.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2A illustrates a centralized database architecture environment 300, in accordance with one embodiment of the present invention. The centralized database architecture comprises multiple nodes from one or more sources and converge into a centralized database. The system, in this embodiment, may generate a single centralized ledger for data received from the various nodes. The single centralized ledger for data provides a difficult avenue for reviewing a block of a file transfer as it moves through the various applications. There is no means to track the blocks of the file through the process at any point until it has been completely posted. Even at that point, with the amount of data a centralized database digests regularly, the ability to accurately track and trace a single file point or account through the process is not possible.

Using this centralized system, when files are transferred between servers systems use rudimentary row counts, checksum or the like at the trailer or end of the file that indicates how many blocks are within the file and the control total of the file. In the case of a transmission issue, the trailer validation is not ideal. This is because the trailer validation would fail but it would not tell the user which block had an issue. As such, the whole file would need to be re-transmitted. If there are a series of large files that contain even a single block error, the entire batch would need to be re-transmitted instead of just the failed block. However, in the case of a transmission issue the trailer validation would fail since the end of the count would not be reached. However, there would be no indication as to which block had an issue. In this way, the entire file or batch transfer must be restarted and transmitted.

FIG. 2B provides a general block chain system environment architecture 400, in accordance with one embodiment of the present invention. Rather than utilizing a centralized database of data for instrument conversion, as discussed above in FIG. 2A, various embodiments of the invention may use a decentralized block chain configuration or architecture as shown in FIG. 2B in order to facilitate the validation or failure location identification for file transmission. Such a decentralized block chain configuration ensures accurate mapping and tagging of blocks within a files during or after the transmission. Accordingly, a block chain configuration may be used to maintain an accurate ledger of files and the processing of transmission of the files by generation of a hash building of one or more blocks for each file of the transmission. In this way, building a traceable and trackable historic view of each file transmission for failure location identification.

A block chain is a distributed database that maintains a list of data blocks, such as real-time resource availability associated with one or more accounts or the like, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies. The data blocks recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. As such, the status of the instrument and the resources associated therewith can be validated and cleared by one participant.

The block chain system typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person, and blocks are created by users known as "miners" who use specialized software/equipment to create blocks. In some embodiments, the block chain system is closed, as such the number of miners in the current system are known and the system comprises primary sponsors that generate and create the new blocks of the system. As such, any block may be worked on by a primary sponsor. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases that meets other criteria.

As mentioned above and referring to FIG. 2B, a block chain system 400 is typically decentralized—meaning that a distributed ledger 402 (i.e., a decentralized ledger) is maintained on multiple nodes 408 of the block chain 400. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains. In some embodiments, the nodes 408 of the system might be financial institutions that function as gateways for other financial institutions. For example, a credit union might hold the account, but access the distributed system through a sponsor node.

Various other specific-purpose implementations of block chains have been developed. These include distributed domain name management, decentralized crowd-funding, synchronous/asynchronous communication, decentralized real-time ride sharing and even a general purpose deployment of decentralized applications.

FIG. 3 provides a high level process flow illustrating node interaction within a block chain system environment architecture 500, in accordance with one embodiment of the present invention. As illustrated and discussed above, the block chain system may comprise at least one or more nodes used to generate blocks and process hashing within file transmission for transmission validation or failure location identification during file transfers across servers.

In some embodiments, the channel node 504, payments node 506, monitor node 516 or the clearing node 508 may publish a pending transaction 510 to the private block chain 502. A pending transaction 510 as used herein may refer to a file being transferred with a hash tagged to the end of the file. At this stage, the transaction has not yet been validated by the miner node(s) 512, and the other nodes will delay executing their designated processes. The miner node 512 may be configured to detect a pending transaction 510 or steps in the process of transmitting the file. Upon verifying the integrity of the data in the pending transaction 510, the miner node 512 validates the transaction and adds the data as a transactional record 514, which is referred to as a block in some embodiments of the application, to the private block chain 502. Once a transaction has been authenticated in this manner, the nodes will consider the transactional record 514 to be valid and thereafter execute their designated processes accordingly. The transactional record 514 will provide information about what file was just processed and transmitted through and metadata coded therein for searchability of the transactional record 514 within a distributed ledger.

In some embodiments, the system may comprise at least one additional miner node 512. The system may require that pending transactions 510 be validated by a plurality of miner nodes 512 before becoming authenticated blocks on the block chain. In some embodiments, the systems may impose a minimum threshold number of miner nodes 512 needed to verify each file with a hash associated therewith. The minimum threshold may be selected to strike a balance between the need for data integrity/accuracy versus expediency of processing. In this way, the efficiency of the computer system resources may be maximized.

Furthermore, in some embodiments, a plurality of computer systems are in operative networked communication with one another through a network. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In some embodiments, the computer systems represent the nodes of the private block chain, such as the miner node or the like. In such an embodiment, each of the computer systems comprise the private block chain, providing for decentralized access to the block chain as well as the ability to use a consensus mechanism to verify the integrity of the data therein. In some embodiments, an upstream system and a downstream system are further operatively connected to the computer systems and each other through the network. The upstream system further comprises a private ledger and the private block chain. The downstream system further comprises the private block chain and an internal ledger, which in turn comprises a copy of the private ledger.

In some embodiments, a copy of private block chain may be stored on a durable storage medium within the computer systems or the upstream system or the downstream system. In some embodiments, the durable storage medium may be RAM. In some embodiments, the durable storage medium may be a hard drive or flash drive within the system.

FIG. 4 provides a high level process map illustrating hash tagging of blocks for file transmission 100, in accordance with one embodiment of the present invention. As illustrated in block 102, the process 100 is initiated by identifying blocks within files for transmission between a sending server and a receiving server. These blocks may include data, applications, programs, updates, or the like. In some embodiments, the blocks may be converted from legacy organization into a current platform while being processed for transmission to the receiving server. Generally, there could be millions of rows of data within one file that is being transmitted to a receiving server. Currently, random checks and/or downstream record counts are used to identify any failures or corruption in the data of the files being transferred to the receiving server. As such, either all the files and records within the files get transferred to the receiving server or a failure is detected and none of the files get transferred and the transmission of files must start over. Using the present invention, the system identifies and pinpoints exact locations of failures and can simply re-transmit that portion of the file, instead of requiring re-transmission of the entire file. This saves time and memory and significantly increases processing speed for server transmission.

As illustrated in block 104, the process 100 continues by generating a cryptographic hash and tagging the hash to the end of a completed block. Each generated cryptographic hash is specific for the block that it is tagged to. In some embodiments, a hash will be tagged to and associated with each block. In other embodiments, a hash will be tagged to and associated with each file. The hash contains information about the data in the block as well as information about the last hash that was generated and tagged to the end of the previous block in the file. The hash is a block chain cryptographic hash that may tagged to the block and stored as a block within a private block chain, illustrated in FIGS. 2-3. In this way, the system can identify the last hash transmitted to the receiving server. This will provide an indication of which block may have failed to transmit. Furthermore, the system may match the data from the hashes at the end of each block to identify if the data matches the originally generated hash to identify if one or more of the blocks has been corrupted during transmission.

Next, as illustrated in block 106, the process 100 continues by continuing the generation of cryptographic hash tags for each subsequent block within the file. Each of the hashes contains the previous blocks hash and data about the current block. When the hash has been tagged to the end of the block, the system may allow for transmission of the file containing the blocks to the appropriate receiving server, as illustrated in block 108. A key that corresponds to each hash may be saved and stored on the private block chain.

As illustrated in block 110, the process 100 continues by generating a private block chain network with all servers receiving file transmissions and adding the file transmission to the block chain. In this way, the system may add the hash in the form of a key to the private block chain for later matching of data to the key to identify and validate the files. Accordingly, a block chain configuration may be used to maintain an accurate ledger of each application and process stage the transaction and/or account resides, in real time. A block chain typically includes several nodes, which may be one or more systems, machines, computers, databases, data stores or the like operably connected with one another as described in more detail above.

Finally, as illustrated in block 112, the process is completed by recalculating the hashes and keys to determine file validation or transmission failure.

FIG. 5 provides a process map illustrating validation and failure location processing 700, in accordance with one embodiment of the present invention. As illustrated in block 702, the process 700 is initiated by comparing the cryptographic hash of the transmitted file to a regenerated cryptographic hash of the file received at the receiving server. In some embodiments, the comparison of the hashes may generate a perfect match. In other embodiments, the comparison of the hashes may identify a difference between the two hashes and the data associated therewith.

As illustrated in block 704, the system has identified a perfect match of the compared hashes. If a perfect match between the cryptographic hash of the transmitted file that is stored on a block chain to the regenerated cryptographic hash of the file received at the receiving server occurs, than the system may validate the transmission of the file, as illustrated in block 706.

As illustrated in block 708, the system has identified a difference between the two hashes and the data associated therewith. In this way, there is a failure of transmission of the data to the receiving server. As illustrated in block 710, the identification of differences in the hash comparison triggers a failure of the transmission of the data to the receiving server.

Next, as illustrated in block 712, the process 700 continues by identifying the specific data block within the file where the failure occurred. In this way, the system may compare each hash at the end of each block to identify the first hash that is different. As such, the cryptographic hash of the transmitted file that is stored on a block chain for each block is compared to the regenerated cryptographic hash of each block of the file received at the receiving server to identify the first hash that is different. Each subsequent hash will also be different since the next hash has the previous hash embedded therein.

As illustrated in block 714, the process 700 continues by retransmitting the block associated with the hash of the block that was mismatched to the receiving server for integration into the file at the receiving server. Finally, the process 700 is finalized by confirming the validation of the retransmitted file, as illustrated in block 716.

FIG. 6 provides a detailed process map illustrating hash generation and file transmission for validation or failure location identification 600, in accordance with one embodiment of the present invention. As illustrated in block 602, the file that is being transmitted to a receiving server. In some embodiments, the file is a legacy file with a header, data, and a trailer. The file comprises Block 1, Block 2, Block 3, and Block 4 all containing various data for the transfer of the data to a receiving location. The files for transfer 603 are then prepared for hash generation. A trailer is no longer needed and it is replaced by a digitally signed block chain file. The transactions are grouped in data blocks, the blocks can be a combination of one or more transactions bundled together into the block. As illustrated in block 604, a hash is generated for each block. Next, each block is combined with a hash of the previous block to create a hash for that block, as illustrated in block 606 where the hash of the data and the previous block hash are combined for each block. Next, as illustrated in block 608, a new file with the block chain hash is generated for each block. The cryptographic hash generated is combined with the data from the block to form a new file which can be transmitted via a private block chain network and produces a file with digitally singed block for each block that can be validated.

As illustrated in block 610, the system may generate a single hash for the entire data file for a quick validation process. The data file with the block chain is sent as a single file and the unique file hash may be sent as a separate file, this is illustrated in more detail below in FIG. 7. In some embodiments, the hash for the entire file may be used for a quick validation of the entire file. If the hash for the entire file does not match, each individual block hash may be compared for identifying the data that has failed for transmission.

Block 612 illustrates the file received by the receiving server 1. The hash for the entire file and/or the hash for each individual block are compared between the transmitted hash and the regenerated hash regenerated at the receiving server of the received file, this is illustrated in block 614. Finally, the system identifies the hashes match and validate the transmission of the data to the receiving server, as illustrated in block 616.

FIG. 7 provides a detailed process map illustrating hash generation and file transmission for validation or failure location identification 800, in accordance with one embodiment of the present invention. As illustrated in block 802, the data for transmission are transactions. These transactions are grouped in blocks or blocks. As illustrated in block 804, a hash is generated for each of the transaction blocks. Next, as illustrated in block 806, each hash of data and the previous block hash are combined to form the cryptographic hash for each individual transaction block. As such, as illustrated in block 808, the new files in form of transaction blocks are generated with their individual block chain hashes tagged onto the transaction block. Furthermore, a hash of the entire file is generated.

The hash of the entire file may be transmitted to the receiving server in a separate file. As illustrate in block 816, File 3 for transmission to the receiving server is the hash of the entire file which is the control file with a cryptographic hash for the entire file. Also, sent to the receiving server in a separate file is File 2, which is the block chain hash files for each of the transaction blocks, as illustrated in block 814. Also, a third file, File 1 may be transmitted to the receiving server which is the data file, as illustrated in block 812. As illustrated in block 818, in some embodiments, the control file with cryptographic has may be used to validate the entire file.

FIG. 8 provides a detailed process map illustrating using a merkle tree for hash generation and file transmission for validation or failure location identification 900, in accordance with one embodiment of the present invention. A merkle tree is a tree in which every node is labelled with the hash of the data. This allows for efficient and secure verification of the contents of larger data structures with one or more files with multiple blocks within each file to be processed and transmitted to a receiving server. The merkle tree can be used to validate the entire database with millions or billions of transaction using a single root hash. The merkle tree can also be used to validate multiple files using a key in case the data file is split between multiple files. The hash may be a SHA256 hash or another cryptographic hashing function. As illustrated there are multiple data files, including Data File 1 902, Data File 2 904, Data File 3 906, and Data File 4 908. These data files may contain blocks, each block containing multiple transactions. While only five blocks are illustrated in the data files, one of ordinary skill in the art will appreciate that more blocks could be within each file. A hash is then generated for each data file. These include Hash 910, Hash 912, Hash 914, and Hash 916. The hashes are then combined in the merkle tree to generate Hash 918 and Hash 920. Finally, those hashes are combined to generate a root hash 922. This root hash 922 may be used for verification of all of the data within all of the original data files.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for file based transmission validation and failure location identification, the system comprising:
a memory device with computer-readable program code stored thereon;
a communication device;
a processing device operatively coupled to the memory device and the communication device, wherein the processing device is configured to execute the computer-readable program code to:
receive a file comprising one or more blocks for private transmission to a receiving server wherein the file is on a private block chain network;
generate a cryptographic hash for each of the one or more blocks;
tag the cryptographic hash onto each of the one or more blocks, wherein the tagged cryptographic hash includes a hash value, a hash from a previous block, and data about the one or more blocks the hash is tagged to;
add information about the cryptographic hash as a key to the private block chain network, wherein the key is a regenerated cryptographic hash;
generate a complete file cryptographic hash, wherein the complete file cryptographic hash is a single unique hash for the file comprising the one or more blocks;
transmit the file to the receiving server upon tagging of each of the one or more blocks with the cryptographic hashes;
compare the complete file cryptographic hash of the transmitted file with the regenerated cryptographic hash of the file received at the receiving server;
identify a difference in the complete file cryptographic has of the transmitted file and the regenerated cryptographic hash of the file received, wherein the difference indicates a failure of transmission at one of the one or more blocks;
back search and compare each cryptographic hash for each of the one or more blocks within the transmitted file to identify a block where a mismatch occurred; and
retransmit the block where the mismatch occurred and confirm validation of the retransmitted file.

2. The system of claim 1, further comprises identifying an exact match between the complete file cryptographic hash of the transmitted file with the regenerated cryptographic hash of the file received at the receiving server and validating the transmission.

3. The system of claim 1, wherein receiving the file comprising one or more blocks for private transmission to a receiving server further comprises receiving legacy files with a header, data, and trailer for conversion and/or receiving new files with a digitally signed block chain file.

4. The system of claim 1, further comprises tagging a first cryptographic hash onto a first block of the one or more blocks containing a hash and data about the first block and tagging a second cryptographic hash onto a second block of the one or more blocks containing the first cryptographic hash and data about the second block.

5. The system of claim 1, wherein each cryptographic hash generated for each of the one or more blocks contains a unique hash value, data about the block associated with the hash, and a copy of a previous block cryptographic hash.

6. The system of claim 1, wherein the complete file cryptographic hash is a SHA256 hash.

7. A computer program product for file based transmission validation and failure location identification, the computer program product comprising at least one non-transitory computer-readable medium having computer-readable program code portions embodied therein, the computer-readable program code portions comprising:
an executable portion configured for receiving a file comprising one or more blocks for private transmission to a receiving server wherein the file is on a private block chain network;
an executable portion configured for generating a cryptographic hash for each of the one or more blocks;
an executable portion configured for tagging the cryptographic hash onto each of the one or more blocks, wherein the tagged cryptographic hash includes a hash value, a hash from a previous block, and data about the one or more blocks the hash is tagged to;
an executable portion configured for adding information about the cryptographic hash as a key to the private block chain network, wherein the key is a regenerated cryptographic hash;
an executable portion configured for generating a complete file cryptographic hash, wherein the complete file cryptographic hash is a single unique hash for the file comprising the one or more blocks;

an executable portion configured for transmitting the file to the receiving server upon tagging of each of the one or more blocks with the cryptographic hashes;

an executable portion configured for comparing the complete file cryptographic hash of the transmitted file with the regenerated cryptographic hash of the file received at the receiving server;

an executable portion configured for identifying a difference in the complete file cryptographic has of the transmitted file and the regenerated cryptographic hash of the file received, wherein the difference indicates a failure of transmission at one of the one or more blocks;

an executable portion configured for back searching and comparing each cryptographic hash for each of the one or more blocks within the transmitted file to identify a block where a mismatch occurred; and an executable portion configured for retransmitting the block where the mismatch occurred and confirm validation of the retransmitted file.

8. The computer program product of claim 7, further comprising an executable portion configured for identifying an exact match between the complete file cryptographic hash of the transmitted file with the regenerated cryptographic hash of the file received at the receiving server and validating the transmission.

9. The computer program product of claim 7, wherein receiving the file comprising one or more blocks for private transmission to a receiving server further comprises receiving legacy files with a header, data, and trailer for conversion and/or receiving new files with a digitally signed block chain file.

10. The computer program product of claim 7, further comprising an executable portion configured for tagging a first cryptographic hash onto a first block of the one or more blocks containing a hash and data about the first block and tagging a second cryptographic hash onto a second block of the one or more blocks containing the first cryptographic hash and data about the second block.

11. The computer program product of claim 7, wherein each cryptographic hash generated for each of the one or more blocks contains a unique hash value, data about the block associated with the hash, and a copy of a previous block cryptographic hash.

12. The computer program product of claim 7, wherein the complete file cryptographic hash is a SHA256 hash.

13. A computer-implemented method for file based transmission validation and failure location identification, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving a file comprising one or more blocks for private transmission to a receiving server wherein the file is on a private block chain network;

generating a cryptographic hash for each of the one or more blocks;

tagging the cryptographic hash onto each of the one or more blocks, wherein the tagged cryptographic hash includes a hash value, a hash from a previous block, and data about the one or more blocks the hash is tagged to;

adding information about the cryptographic hash as a key to the private block chain network, wherein the key is a regenerated cryptographic hash;

generating a complete file cryptographic hash, wherein the complete file cryptographic hash is a single unique hash for the file comprising the one or more blocks;

transmitting the file to the receiving server upon tagging of each of the one or more blocks with the cryptographic hashes;

comparing the complete file cryptographic hash of the transmitted file with the regenerated cryptographic hash of the file received at the receiving server;

identifying a difference in the complete file cryptographic has of the transmitted file and the regenerated cryptographic hash of the file received, wherein the difference indicates a failure of transmission at one of the one or more blocks;

back searching and comparing each cryptographic hash for each of the one or more blocks within the transmitted file to identify a block where a mismatch occurred; and retransmitting the block where the mismatch occurred and confirm validation of the retransmitted file.

14. The computer-implemented method of claim 13, further comprises identifying an exact match between the complete file cryptographic hash of the transmitted file with the regenerated cryptographic hash of the file received at the receiving server and validating the transmission.

15. The computer-implemented method of claim 13, wherein receiving the file comprising one or more blocks for private transmission to a receiving server further comprises receiving legacy files with a header, data, and trailer for conversion and/or receiving new files with a digitally signed block chain file.

16. The computer-implemented method of claim 13, further comprises tagging a first cryptographic hash onto a first block of the one or more blocks containing a hash and data about the first block and tagging a second cryptographic hash onto a second block of the one or more blocks containing the first cryptographic hash and data about the second block.

17. The computer-implemented method of claim 13, wherein each cryptographic hash generated for each of the one or more blocks contains a unique hash value, data about the block associated with the hash, and a copy of a previous block cryptographic hash.

* * * * *